United States Patent
Kuo et al.

(10) Patent No.: US 9,651,245 B2
(45) Date of Patent: May 16, 2017

(54) METHOD OF APPLYING ELECTRIC ARC FURNACE DUST IN CHEMICAL LOOPING COMBUSTION PROCESS

(71) Applicant: National Tsing Hua University, Hsinchu (TW)

(72) Inventors: Yu-Lin Kuo, New Taipei (TW); Wei-Chen Huang, New Taipei (TW); Young Ku, Taipei (TW); Yao-Hsuan Tseng, Taipei (TW); Chung-Sung Tan, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 530 days.

(21) Appl. No.: 14/306,552

(22) Filed: Jun. 17, 2014

(65) Prior Publication Data
US 2015/0167965 A1    Jun. 18, 2015

(30) Foreign Application Priority Data
Dec. 18, 2013  (TW) .............................. 102146988 A

(51) Int. Cl.
F23C 13/08    (2006.01)
F23C 99/00    (2006.01)
F27D 17/00    (2006.01)

(52) U.S. Cl.
CPC ............ *F23C 99/00* (2013.01); *F27D 17/008* (2013.01); *F23C 2900/99008* (2013.01); *Y02E 20/346* (2013.01)

(58) Field of Classification Search
CPC ............ F23C 99/00; F23C 2900/99008; F27D 17/008; Y02E 20/346
See application file for complete search history.

(56) References Cited

U.S. PATENT DOCUMENTS

2008/0164443 A1* 7/2008 White .................... B01J 23/002
                                                252/373

FOREIGN PATENT DOCUMENTS

TW         I241348 B      10/2005
TW         201304865 A    2/2013

* cited by examiner

*Primary Examiner* — Alfred Basichas
(74) *Attorney, Agent, or Firm* — Huffman Law Group, PC

(57) ABSTRACT

The present invention discloses a method of applying electric arc furnace dust in chemical looping combustion process, and particularly a method of applying electric arc furnace dust in chemical looping combustion process without releasing of zinc vapor. The method of applying electric arc furnace dust in chemical looping combustion process comprises following steps: (1) providing an electric arc furnace dust and an inert support ($Al_2O_3$) and mixing the electric arc furnace dust and the inert support ($Al_2O_3$) to obtain a mixture of the electric arc furnace dust and the inert support ($Al_2O_3$); (2) calcining the mixture of the electric arc furnace dust and the inert support ($Al_2O_3$) with high temperature to obtain another mixture of $Fe_2O_3$, $ZnAl_2O_4$, and $Al_2O_3$; (3) applying the mixture of $Fe_2O_3$, $ZnAl_2O_4$, and $Al_2O_3$ as oxygen carrier and inert support in a chemical looping combustion process.

9 Claims, 6 Drawing Sheets

|     | weight(%) | RSD(%) |
| --- | --- | --- |
| Fe  | 26.04 | 0.7 |
| Zn  | 16.05 | 0.7 |
| Mn  | 2.07 | 0.7 |
| Pb  | 1.56 | 0.7 |
| Cr  | 0.35 | 0.9 |
| Cu  | 0.15 | 0.9 |
| Ca  | 3.07 | 0.8 |
| K   | 0.97 | 1.0 |
| Cl  | 4.06 | 0.9 |
| Ni  | 148.2ppm | 2.4 |
| V   | 261.5ppm | 3.4 |
| Br  | 659.3ppm | 0.9 |
| Sr  | 44.6ppm | 2.7 |

FIG.3

METHOD OF APPLYING ELECTRIC ARC FURNACE DUST IN CHEMICAL LOOPING COMBUSTION PROCESS

BACKGROUND OF THE INVENTION

1. Field of the Invention

The present invention relates to a method of applying electric arc furnace dust in chemical looping combustion process, and particularly a method of applying electric arc furnace dust in chemical looping combustion process without emission of zinc vapor.

2. Description of Related Art

The electric arc furnace dust (EAFD) are particulate matters. These particulate matters are generated in smelting process of an electric arc furnace and are captured by dust collector before the dust of the electric arc furnace is emitted from the high temperature and pressure furnace (or the electric arc furnace) into the air. The EAFD comprises compounds composed of zinc (Zn), manganese (Mn), calcium (Ca), magnesium (Mg), nickel (Ni) and trace lead (Pb). In most countries, EAFD is considered to be a hazardous waste and is present in any setting involving human activity. In recent years, the numbers of steel mills using waste iron and steel as raw materials is increased rapidly in Taiwan. Now, in Taiwan, there are 19 electric arc furnace (EAF) steel plants using waste iron, stainless steel, and alloy of iron as raw materials, and these electric arc furnace (EAF) steel plants have 26 electric arc furnaces. A large quantity of EAFD is generated per tonne of steel produced and around 140,000 tonnes of EAFD is generated each year in the republic of Taiwan. The electric arc furnace dust (EAFD) is dust having a tiny particle size (or particle diameter) and it is (industrial) waste which is easy to be inhaled by humans and accumulated in bodies. Therefore, Taiwan Environmental Protection Administration (EPA) stipulates that the electric arc furnace dust (EAFD) is hazardous and toxic industrial waste so it has to be treated and recycled. Hydrometallurgical method, vitrification method, and pyrometallurgical treatment method are three common methods of treating the electric arc furnace dust (EAFD). In the present work, EAFD were used to test solid fuel combustion, which containing iron, zinc and the others in low concentrations. However, these processes of refining or purifying the electric arc furnace dust (EAFD) are complicated and the cost of these processes is high. Therefore, there is no method capable of recycling the electric arc furnace dust (EAFD) with simpler process and lower cost until now.

Firepower generation is the most extensively used method of electricity generation, but it has a big problem that a serious air pollution is caused by waste gas (including carbon dioxide) produced by firepower generation. Now, the chemical looping combustion process is a more environmentally friendly method among the methods of firepower generation because the chemical looping combustion process has advantages of low exhaust pollution and high power generation efficiency. The chemical looping combustion process is a promising technology wherein two fluidized bed reactors (fuel reactor and air reactor) are utilized to perform reduction reaction and oxidation reaction in turn for firepower generation. Oxygen carrier plays an important role of transmitting heat and oxygen in chemical looping combustion process. Therefore, a thermogravimetric analysis is utilized for reactivity and feasibility evaluation of oxygen carriers before the chemical looping combustion process. After the reactivity and feasibility evaluation, oxygen carriers are modified and prepared according to the result of the reactivity and feasibility evaluation and the performance of oxygen carriers. However, the preparation of oxygen carriers is time-consuming and non-cost-effective. Therefore, if oxygen carriers, which are cheaper and prepared with simpler process, are applied in the chemical looping combustion process, and particularly oxygen carriers prepared by recycling the industrial waste with simple method and process are applied in the chemical looping combustion process, it is helpful to simplify the preparing process of oxygen carriers and to reduce the cost of the preparing process of oxygen carriers. In such a way, the cost of the chemical looping combustion process can be reduced. However, in recent years, all research of the chemical looping combustion process tends to study how to prepare oxygen carriers with natural ore (such as iron ore and ilmenite ore) for low time consumption and low cost. Therefore, there is no technology is developed to apply industrial waste (such as slag, electric arc furnace dust, etc.) in the chemical looping combustion process.

SUMMARY OF THE INVENTION

One object of the present invention is to provide a method of applying electric arc furnace dust in chemical looping combustion process, and particularly a method of applying electric arc furnace dust in chemical looping combustion process without releasing or emission of zinc vapor. By this method, electric arc furnace dust is treated with simple process for preparing an oxygen carrier, and then the oxygen carrier is applied in chemical looping combustion process. In such a way, the process of preparing oxygen carriers can be simplified and the cost of preparing oxygen carriers can be reduced. Therefore, the cost of chemical looping combustion process can be reduced.

According to one object of the present invention, a method of applying electric arc furnace dust in chemical looping combustion process is provided and disclosed herein. The method of applying electric arc furnace dust in chemical looping combustion process comprises following steps: (1) providing an electric arc furnace dust and an aluminum oxide inert support and mixing the electric arc furnace dust and the aluminum oxide inert support to obtain a mixture of the electric arc furnace dust and the aluminum oxide inert support; (2) calcining the mixture of the electric arc furnace dust and the aluminum oxide inert support with high temperature to prepare another mixture of ferric oxide, Zn—Al compound oxide, and aluminum oxide; and (3) applying the mixture of ferric oxide, Zn—Al compound oxide, and aluminum oxide in a chemical looping combustion process.

Therefore, in the method of applying electric arc furnace dust in chemical looping combustion process provided by the present invention, the electric arc furnace dust is treated with simple process (such as addition of aluminum oxide inert support and high temperature calcination) for preparing a mixture of oxygen carrier (ferric oxide), zinc stabilizer (Zn—Al compound oxide), and inert support (aluminum oxide). When the mixture is applied in the chemical looping combustion process, it plays not only a role of transmitting heat and oxygen but plays a role of stabilizing zinc metal in the chemical looping combustion process for avoiding emission or releasing of zinc vapor and for avoiding influence of all reactions (oxidization reaction and reduction reaction) of the chemical looping combustion process caused by the emission or releasing of zinc vapor. The cost of the method of the present invention is low because the raw material utilized to prepare this mixture is the electric arc furnace dust which is an industrial waste. This method employs simple processes such as addition of aluminum oxide inert support and high temperature calcination in order to prepare this mixture. Therefore, comparing with traditional oxygen carriers, oxygen carriers prepared by the method of the present invention is not only easy and cheap to prepare but helpful to reduce the cost of the chemical looping combustion process.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a drawing illustrating the result of TXRF analysis of untreated electric arc furnace dust.

DETAILED DESCRIPTION OF THE INVENTION

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Although specific embodiments have been illustrated and described, it will be appreciated by those skilled in the art that various modifications may be made without departing from the scope of the present invention, which is intended to be limited solely by the appended claims.

Figure 1:
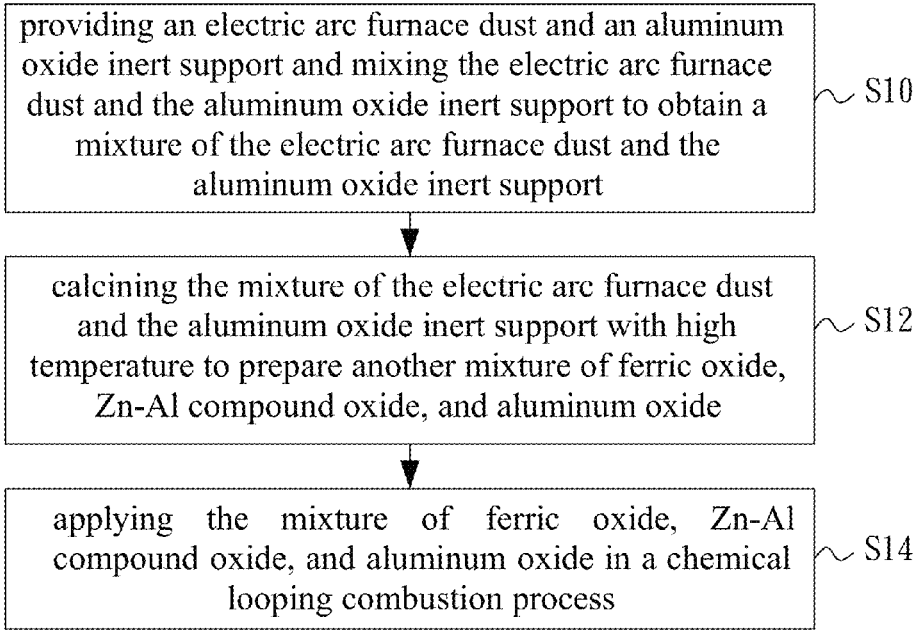
FIG. 1 is a flow chart illustrating a method of applying electric arc furnace dust in chemical looping combustion process according to one embodiment of the present invention.

Please refer to FIG. 1, it is a flow chart illustrating a method of applying electric arc furnace dust in chemical looping combustion process according to one embodiment of the present invention.

As shown is FIG. 1, the method of the present invention comprises following steps: In step S10, an electric arc furnace dust and an aluminum oxide inert support are provided, and then they are uniformly mixed with each other in order to obtain a mixture of the electric arc furnace dust and the aluminum oxide inert support. In step S12, the mixture of the electric arc furnace dust and the aluminum oxide inert support is calcined for preparing a mixture comprised of ferric oxide, Zn—Al compound oxide, and aluminum oxide. In step S14, the mixture of ferric oxide, Zn—Al compound oxide, and aluminum oxide is introduced into a reactor and the mixture is used as oxygen carriers for performing a chemical looping combustion process.

Figure 2:
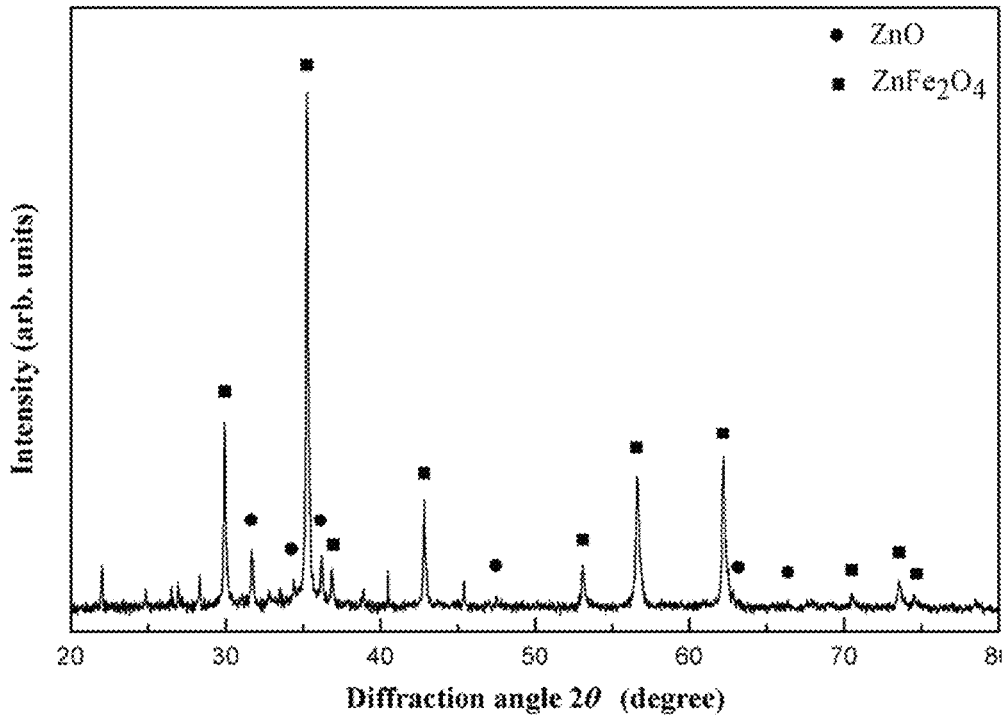
FIG. 2 is a drawing illustrating a XRD diffraction pattern of untreated electric arc furnace dust.

The chemical composition of the EAFD was determined by total-reflection X-ray fluorescence spectrometer (TXRF, Bruker S2 Picofox). The crystalline structure of the oxygen carrier was identified using X-ray diffraction (XRD, Bruker D2 Phaser) with a Cu-K radiation source (=1.5405 Å) in the 2 scan from 20° to 80°. The XRD pattern of this XRD analysis and the result of this TXRF analysis are illustrated in FIG. 2 and FIG. 3 respectively. Referring to FIG. 2 and FIG. 3, according to the XRD pattern of this XRD analysis and the result of this TXRF analysis, it is recognized that the electric arc furnace dust is mainly comprised of zinc oxide (ZnO) and Zn—Fe compound oxide ($ZnFe_2O_4$) having a spinel structure. Further, according to the XRD pattern of this XRD analysis and the result of this TXRF analysis, we can speculate that the molar ratio of zinc oxide (ZnO) and Zn—Fe compound oxide ($ZnFe_2O_4$) in the electric arc furnace dust is about 0.019 mol 0.233 mol, but it is not limit. All electric arc furnace dust which is mainly comprised of zinc oxide (ZnO) and Zn—Fe compound oxide ($ZnFe_2O_4$) having a spinel structure can be utilized in the step S10.

Figure 4:
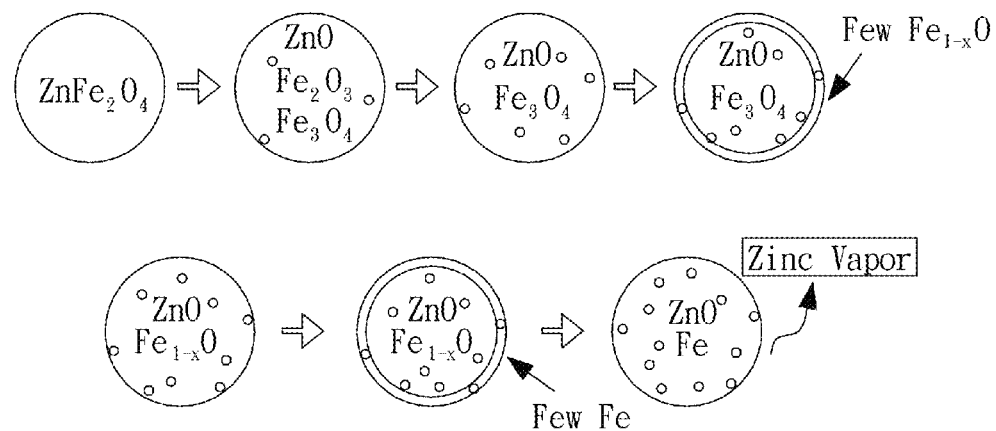
FIG. 4 is a drawing illustrating the reaction mechanism for untreated electric arc furnace dust following increasing of reduction time.

Please refer to FIG. 4, it is a drawing illustrating the reaction mechanism for a untreated electric arc furnace dust, which is not treated by the method of the present invention, following increasing of reduction time. In other words, FIG. 4 is a drawing illustrating reduction-oxidization of the untreated electric arc furnace dust. As shown in FIG. 4, during reduction-oxidization of the untreated electric arc furnace dust, the Zn—Fe compound oxide ($ZnFe_2O_4$) in the untreated electric arc furnace dust is decomposed into zinc oxide (ZnO) and ferric oxide ($Fe_2O_3$) first. Next, the zinc oxide (ZnO) is reduced to form zinc metal which has a low melting point, and then zinc vapor is emitted or released. However, the zinc vapor has a bad influence on the reduction-oxidization of the untreated electric arc furnace dust. Therefore, if the untreated electric arc furnace dust is directly applied in a chemical looping combustion process, it also causes a serious issue of zinc vapor emission or releasing. Accordingly, the untreated electric arc furnace dust can not be directly applied in a chemical looping combustion process until the issue of zinc vapor emission or releasing is improved or resolved.

In the step S10, the aluminum oxide inert support is $Al_2O_3$, and the electric arc furnace dust and the aluminum oxide inert support are uniformly mixed with each other by solid phase ball milling method for preparing (or obtaining) the mixture of the electric arc furnace dust and the aluminum oxide inert support.

Figure 5:
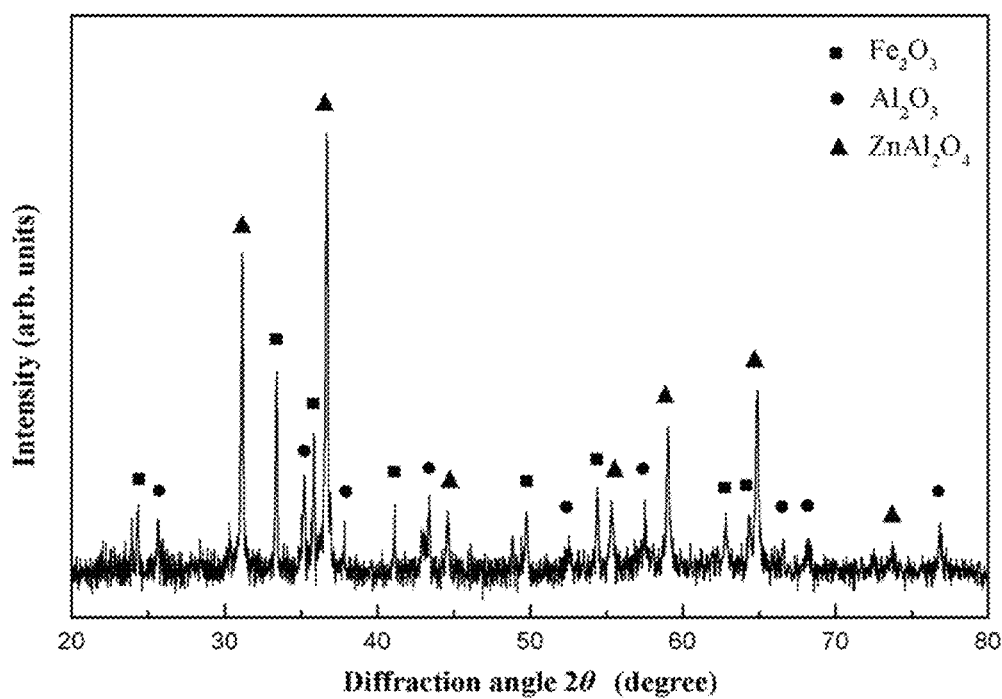
FIG. 5 is a drawing illustrating a XRD diffraction pattern of electric arc furnace dust treated with the method of the present invention.

In the step S12, the mixture of the electric arc furnace dust and the aluminum oxide inert support is calcined at 1100° C. in an aerobic environment for about 2 hours. Therefore, the mixture of the electric arc furnace dust and the aluminum oxide inert support is calcined to prepare or obtain a mixture comprising ferric oxide, Zn—Al compound oxide, and aluminum oxide. This mixture comprising ferric oxide, Zn—Al compound oxide, and aluminum oxide is a treated electric arc furnace dust which is treated by addition of aluminum oxide inert support and calcination under high temperature. the mixture comprising ferric oxide, Zn—Al compound oxide, and aluminum oxide (or the treated electric arc furnace dust) was identified using X-ray diffraction, and the XRD pattern of this XRD analysis is illustrated in FIG. 5. Referring to FIG. 5, the mixture comprising ferric oxide, Zn—Al compound oxide, and aluminum oxide (or the treated electric arc furnace dust) is mainly comprised of $Fe_2O_3$, $ZnAl_2O_4$, and $Al_2O_3$.

Figure 6:
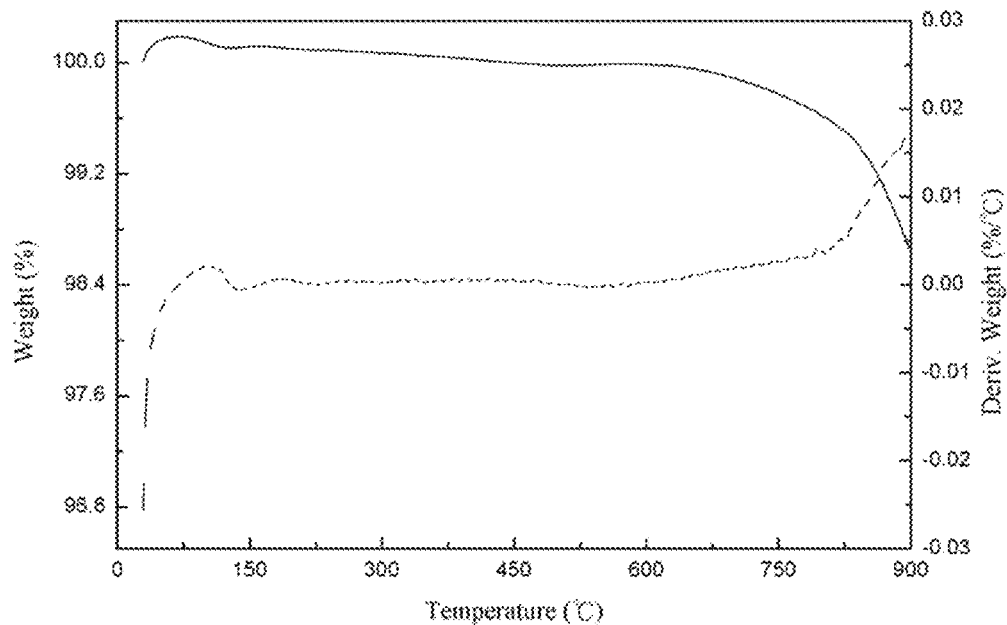
FIG. 6 is a drawing illustrating the result of non-isothermal reduction test of non-isothermal Zn—Al compound oxide ($ZnAl_2O_4$) in electric arc furnace dust treated with the method of the present invention.

Further, the mixture comprising ferric oxide, Zn—Al compound oxide, and aluminum oxide (or the treated electric arc furnace dust provided) was identified using non-isothermal reduction test by a thermogravimetric analyzer. The result of this non-isothermal reduction test is illustrated in FIG. 6. As shown in FIG. 6, the result of this non-isothermal reduction test shows that the Zn—Al compound oxide does not have obvious weight loss until the reduction temperature is higher than 792.7° C. It means that there is no zinc vapor emitted or released from the Zn—Al compound oxide when the temperature is lower than 792.7° C. Therefore, through the treatment (the step S10 and the step S12), the zinc oxide (ZnO) is transformed into the Zn—Al compound oxide ($ZnAl_2O_4$) which is stable and difficult to produce zinc vapor. It is helpful to stabilize the zinc metal component in the electric arc furnace dust and to suppress emission or releasing of zinc vapor in reduction-oxidation or chemical looping combustion process. Therefore, the zinc vapor emission or releasing issue can be resolved. Besides, the Zn—Al compound oxide ($ZnAl_2O_4$) can be used as an inert support because the Zn—Al compound oxide ($ZnAl_2O_4$) does not emit or release zinc vapor when the temperature is lower than 792.7° C.

In the step S14, the treated electric arc furnace dust (or the above-mentioned mixture comprising ferric oxide, Zn—Al compound oxide, and aluminum oxide) is put into a reactor, and a synthesis gas (10% CO+10% $H_2$) is used as a reduction gas and introduced into the reactor for reduction of oxygen carriers. After, air is used as an oxidation gas and introduced into the reactor for oxidation of oxygen carriers. This chemical looping combustion process (or reduction-oxidation) is performed at the temperature which is lower than 792.7° C., and the temperature which is equal to or lower than 750° C. is preferred. The reduction-oxidation equation (or reaction) of the chemical looping combustion process performed by applying the treated (through the step S10 and the step S12) electric arc furnace dust (or the above-mentioned mixture comprising ferric oxide, Zn—Al compound oxide, and aluminum oxide) therein is illustrated as following:

Reduction Equation (or Reaction):

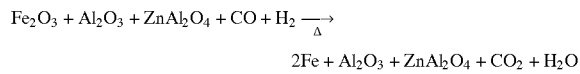

Oxidation Equation (or Reaction):

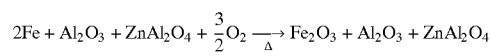

In view of above-mentioned equations (or reactions), it is recognized that the ferric oxide ($Fe_2O_3$) of the treated (through the step S10 and the step S12) electric arc furnace dust is used as an oxygen carrier in the chemical looping combustion process. After the oxygen carrier ($Fe_2O_3$) is reduced in CO and $H_2$, Fe metal is produced. After the Fe metal is oxidized in air, the Fe metal is transformed back to the ferric oxide (or oxygen carrier) ($Fe_2O_3$). In the chemical looping combustion process, the Zn—Al compound oxide ($ZnAl_2O_4$) and the aluminum oxide ($Al_2O_3$) are not reactive and thereby both of them are used as inert supports.

Through analyzing the weight loss of metal oxide in the chemical looping combustion process by the thermogravimetric analyzer, we can know reaction characteristics of the metal oxide, such as reduction time and oxidation time of the metal oxide, conversion rate, oxygen content capable of being provide to the reaction (such as oxidation), etc. After the synthesis gas (10% CO+10% $H_2$) is introduced into the reactor as a reduction gas first and air is introduced into the reactor as an oxidation gas next, the data is introduced into the oxidation rate equation of the reactive oxygen in the metal oxygen carrier for calculating the conversion rate of the (metal) oxygen carrier in repeating reduction-oxidation reactions. In such a way, we can know whether the conversion rate of the (metal) oxygen carrier is changed in these repeating reduction-oxidation reactions. Furthermore we can obtain the reaction activity of the chemical looping combustion process. The oxidation rate equation of the reactive oxygen is shown as following:

$$X = 1 - \frac{W_{ox} - W}{aW_{ox}R_0}$$

X: the oxidation rate (%) of the reactive oxygen;
a: weight ratio (WT %) of the metal oxygen carrier in the sample (WT %), if there is any other inert oxides composite with the metal oxygen carrier, it need to be multiplied by this parameter;
$R_0$: weight ratio (WT %) of the reactive oxygen;
$W_{ox}$: weight (mg) of completely oxidation portion of the metal oxygen carrier, which is also the initial weight of reduction (reaction);
W: weight variation (mg) of the metal oxygen carrier in weight following time.

Figure 7:
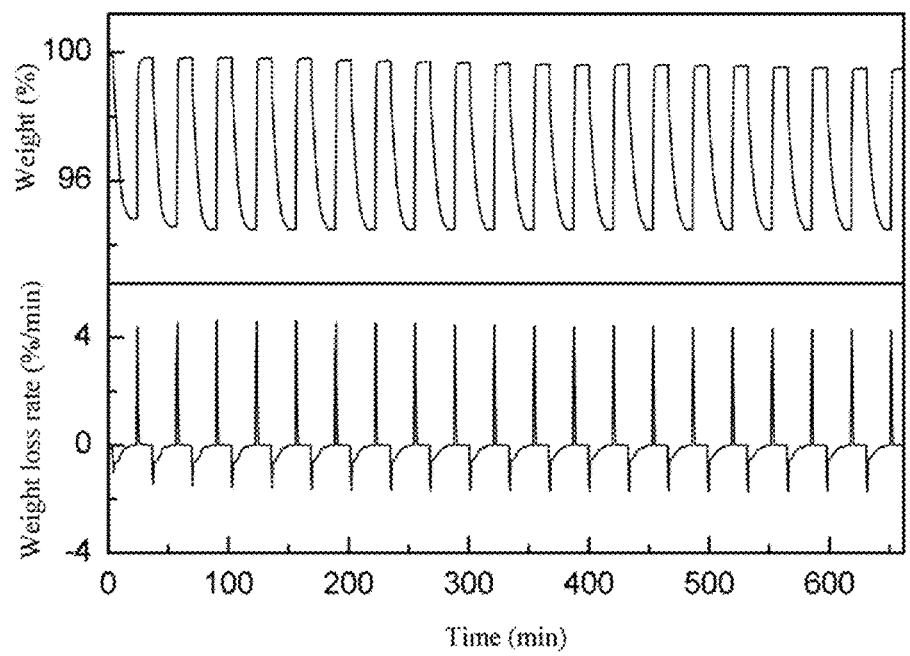
FIG. 7 is a drawing illustrating the twenty times of redox reactions with syngas and air for the treated electric arc furnace dust.
Figure 8A:
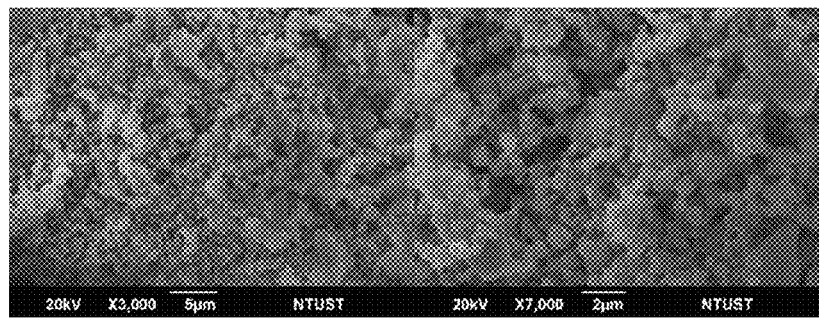
FIG. 8A to FIG. 8D are drawings respectively illustrating SEM pictures of the treated electric arc furnace dust, which is treated with the method of the present invention, at 750° C. after different reduction-oxidization cycles.
Figure 8B:
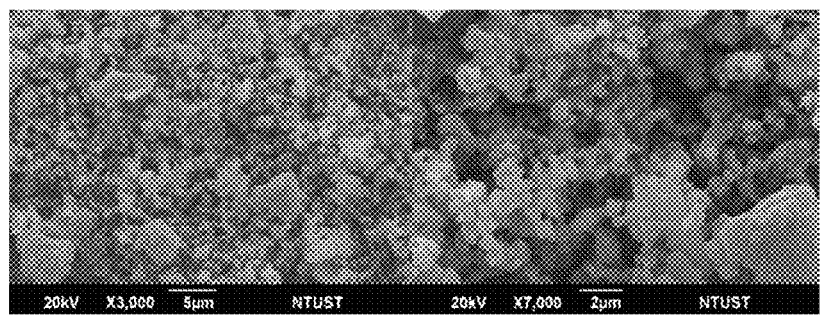
Figure 8C:
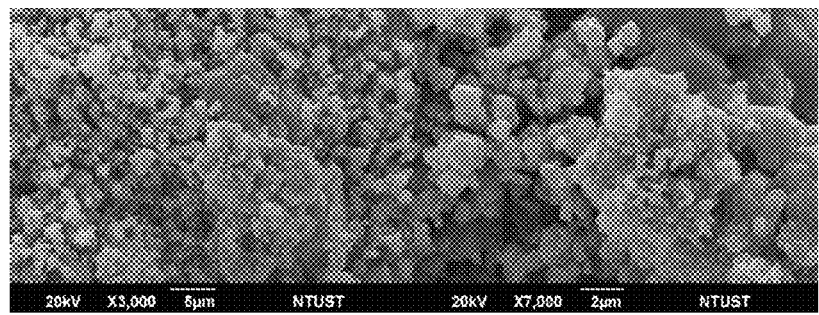
Figure 8D:
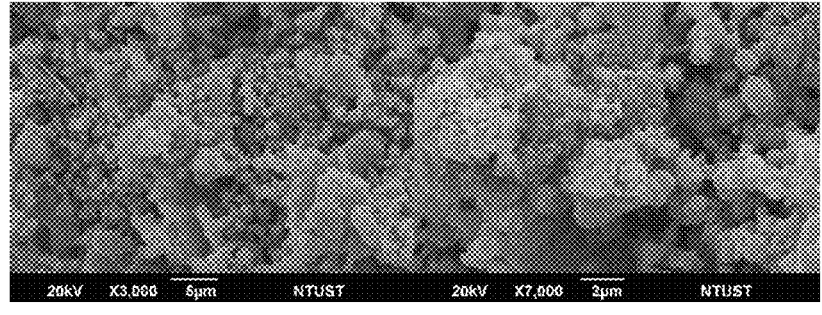

Through above-mentioned method, a test of reaction activity is performed to the method of applying electric arc furnace dust in chemical looping combustion process of the present invention for proving whether the method of the present invention can efficiently improve or resolve the zinc vapor emission (or releasing) issue caused by applying electric arc furnace dust in the chemical looping combustion process. This test is performed by twenty times of redox reactions with syngas and air for the treated electric arc furnace dust. The result of this test is illustrated in FIG. 7. FIG. 7 is a drawing illustrating the twenty times of redox reactions with syngas and air for the treated electric arc furnace dust at 750° C. As shown in FIG. 7, in the twenty times of redox reactions, each patter in FIG. 7, which represents each cycle of the twenty times of redox reactions, has no obvious variation. Therefore, it can prove that the reaction efficiency of the chemical looping combustion process performed with the treated electric arc furnace dust treated by the method of the present invention can be maintain without obvious decline. It can also prove that the treated electric arc furnace dust treated by the method of the present invention has an ability to perform many cycles of the chemical looping combustion process (or many reduction-oxidation cycles). Furthermore, it further proves that there is no zinc vapor produced in the method of applying electric arc furnace dust in chemical looping combustion process of the present invention because the test result of reaction activity of the chemical looping combustion process shown in FIG. 7 has no obvious variation. Therefore, it also proves that the method of the present invention can efficiently improve or resolve the zinc vapor emission (or releasing) issue caused by applying electric arc furnace dust in the chemical looping combustion process.

Please refer to FIG. 8A to FIG. 8D, FIG. 8A to FIG. 8D are drawings respectively illustrating SEM pictures of the treated electric arc furnace dust, which is treated with the method of the present invention, at 750° C. after different reduction-oxidization cycles. The reduction-oxidization cycles illustrated in FIG. 8A, FIG. 8B, FIG. 8C, and FIG. 8D are unreacted (zero reduction-oxidization cycle), five reduction-oxidization cycles, ten reduction-oxidization cycles, and twenty reduction-oxidization cycles respectively. Referring to FIG. 8A to FIG. 8D, it is recognized that there are some slight agglomerations formed on the surface after many reduction-oxidization cycles. However, these agglomerations are not obvious and thereby these agglomerations do not have any influence on the chemical looping combustion process (or reduction-oxidization).

Figure 9:
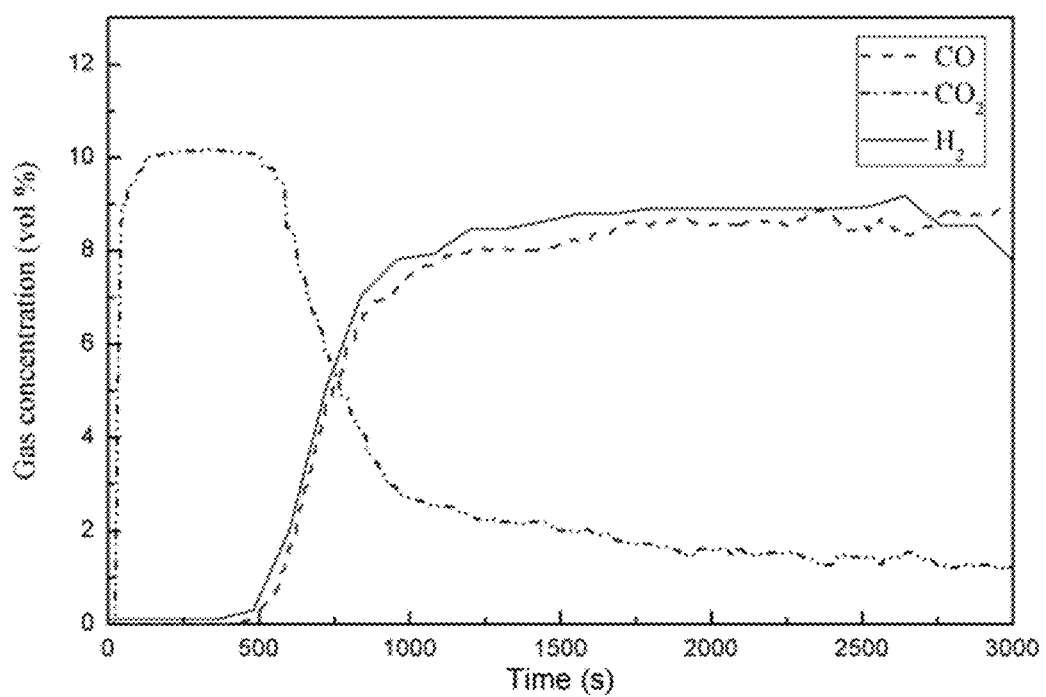
FIG. 9 is a drawing illustrating $CO_2$ conversion obtained by applying the treated the electric arc furnace dust, which is treated with the method of the present invention, to perform reduction (reaction) in a fixed bed reactor.

Please refer to FIG. 9, FIG. 9 is a drawing illustrating $CO_2$ conversion obtained by applying the treated the electric arc furnace dust, which is treated with the method of the present invention, to perform reduction (reaction) in a fixed bed reactor. FIG. 9 is also a drawing illustrating the test result of the reactivity of the method of applying electric arc furnace dust in chemical looping combustion process in a fixed bed reactor and the test result of the ability of conversing CO into $CO_2$. In these tests, the treated (through the step S10 and the step S12) electric arc furnace dust is put into a fixed bed reactor, and the synthesis gas is introduced into the fixed bed reactor to reduce the oxygen carriers for test. As shown in FIG. 9, it is recognized that the treated (through the step S10 and the step S12) electric arc furnace dust has a good reactivity and it is very suitable for applying in the chemical looping combustion process.

According to foregoing embodiments of the present invention, the present invention teaches how to recycle and treat the electric arc furnace dust, which is the industrial waste, with simple processes, such as mixing with an aluminum oxide inert support, solid phase ball milling, and calcination with high temperature, for preparing oxygen carriers used in the chemical looping combustion process. In the method of the present invention, these oxygen carriers are used in the chemical looping combustion process instead of the oxygen carriers which are prepared with complicated processes and high cost and are used in traditional chemical looping combustion process. Therefore, the cost of preparing the oxygen carriers can be reduced. Furthermore, in the method of the present invention, the zinc vapor emission (or releasing) issue can be improved or resolved by treating the electric arc furnace dust with a simple process. Accordingly, the present invention provides a method of recycling the electric arc furnace dust with simple processes and low cost, and it also develops a method (or technology) of applying industrial waste (such as the electric arc furnace dust) in the chemical looping combustion process.

What is claimed is:

1. A method of applying electric arc furnace dust in chemical looping combustion process, comprising:
    (1) providing an electric arc furnace dust and an aluminum oxide inert support and mixing the electric arc furnace dust and the aluminum oxide inert support to obtain a mixture of the electric arc furnace dust and the aluminum oxide inert support;
    (2) calcining the mixture of the electric arc furnace dust and the aluminum oxide inert support with high temperature to prepare another mixture of ferric oxide, Zn—Al compound oxide, and aluminum oxide; and
    (3) applying the mixture of ferric oxide, Zn—Al compound oxide, and aluminum oxide in a chemical looping combustion process.

2. The method of claim 1, wherein the electric arc furnace dust is mainly comprised of zinc oxide (ZnO) and Zn—Fe compound oxide ($ZnFe_2O_4$).

3. The method of claim 1, wherein the aluminum oxide inert support is $Al_2O_3$.

4. The method of claim 1, wherein in the step (1), the electric arc furnace dust and the aluminum oxide inert support are uniformly mixed with each other by solid phase ball milling method.

5. The method of claim 1, wherein in the step (2), the mixture of the electric arc furnace dust and the aluminum oxide inert support is calcined with high temperature in an aerobic environment for preparing the mixture of ferric oxide, Zn—Al compound oxide, and aluminum oxide.

6. The method of claim 1, wherein in the step (2), the calcined temperature is 1100° C.

7. The method of claim 1, wherein in the mixture of ferric oxide, Zn—Al compound oxide, and aluminum oxide, the ferric oxide is $Fe_2O_3$, as the Zn—Al compound oxide is $ZnAl_2O_4$, and as the aluminum oxide is $Al_2O_3$.

8. The method of claim 1, wherein in the step (3), the ferric oxide is used as an oxygen carrier, and the Zn—Al compound oxide and the aluminum oxide are used as inert supports.

9. The method of claim 1, wherein the process temperature of the chemical looping combustion process is lower than 792.7° C.

* * * * *